Patented Aug. 20, 1940

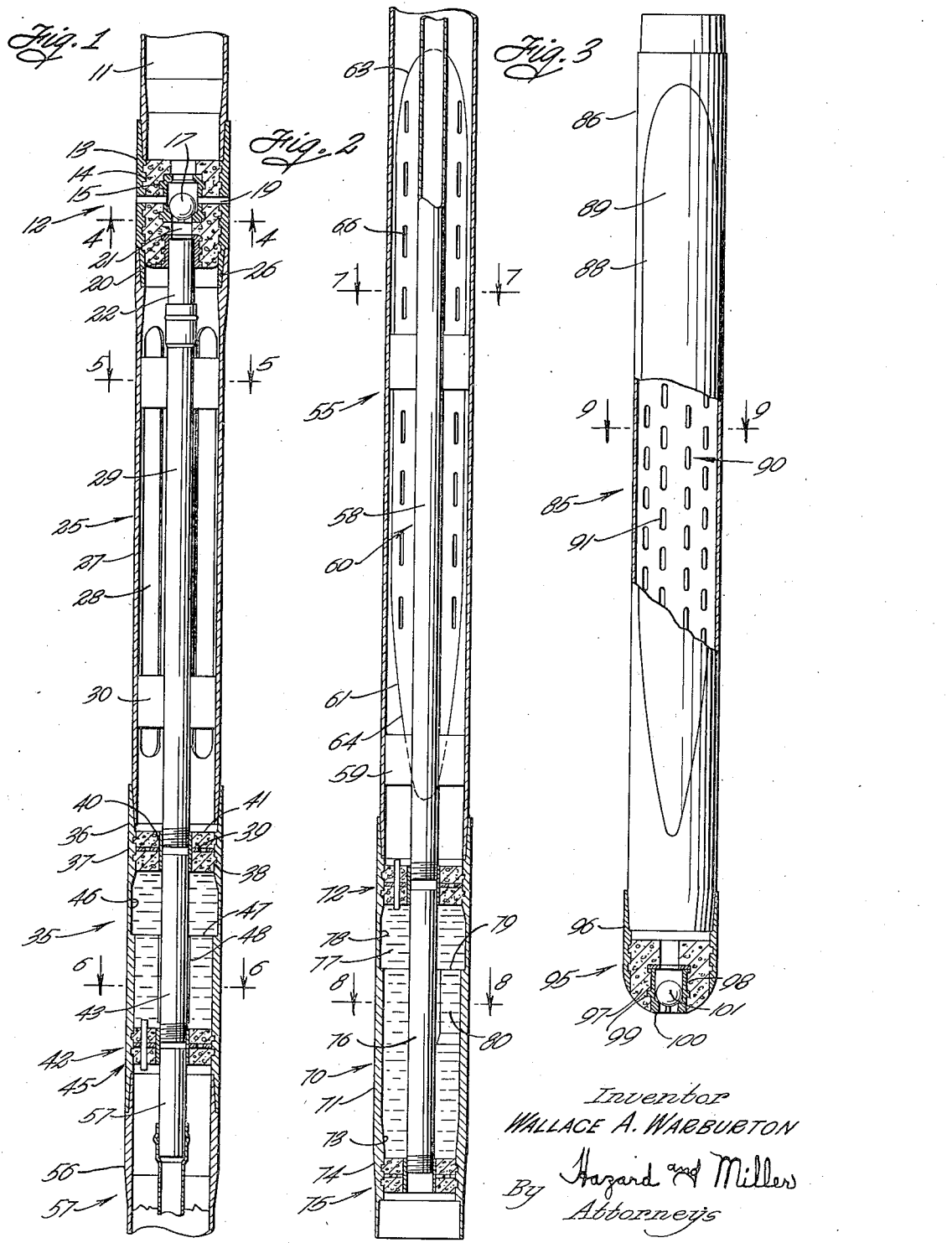

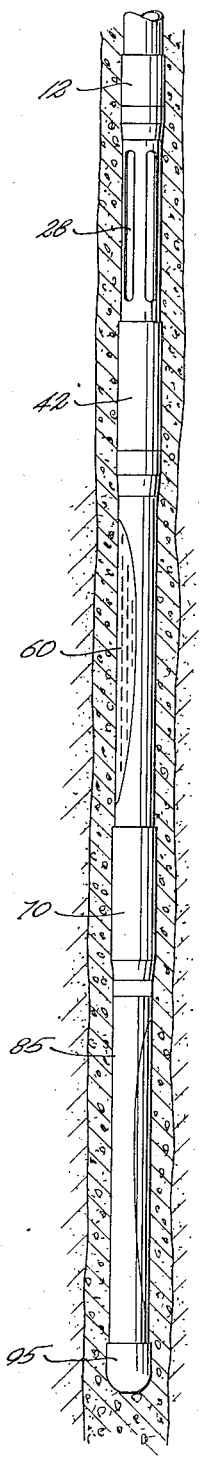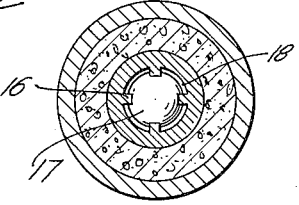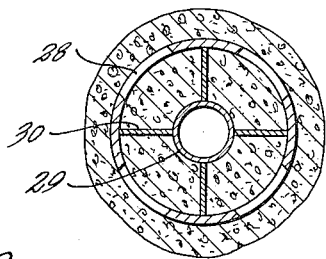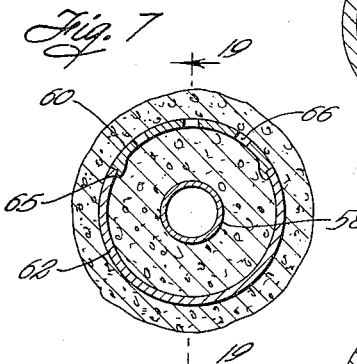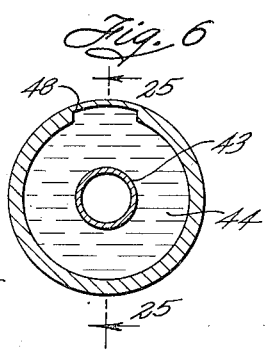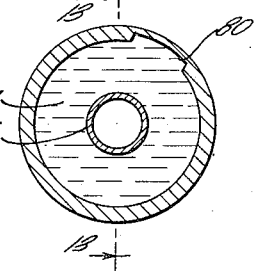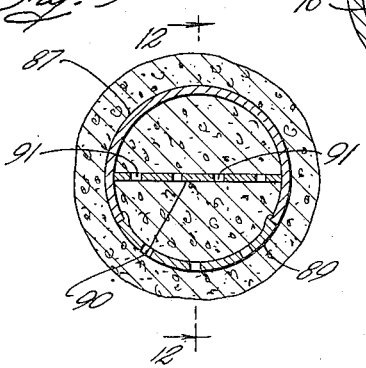

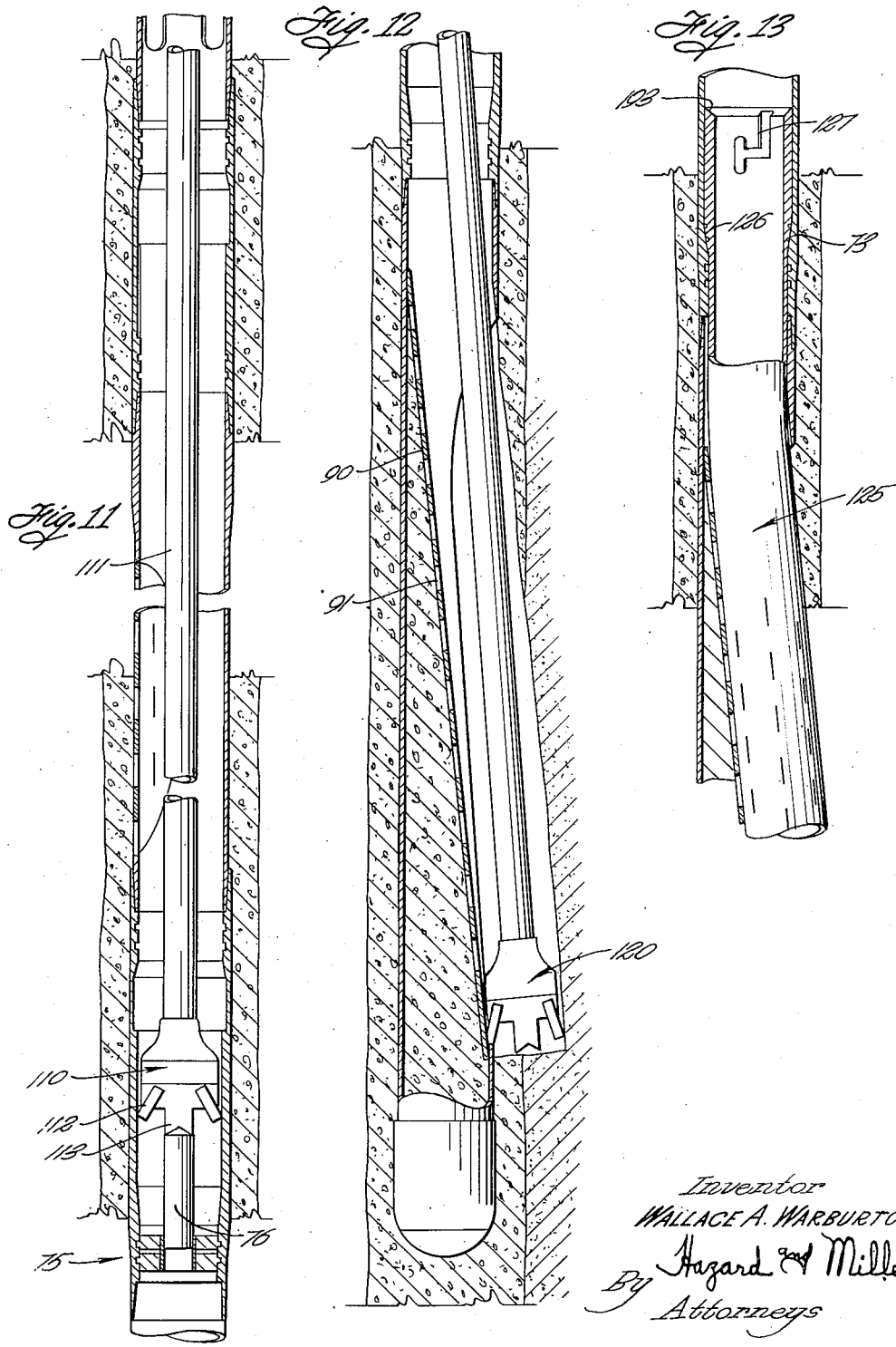

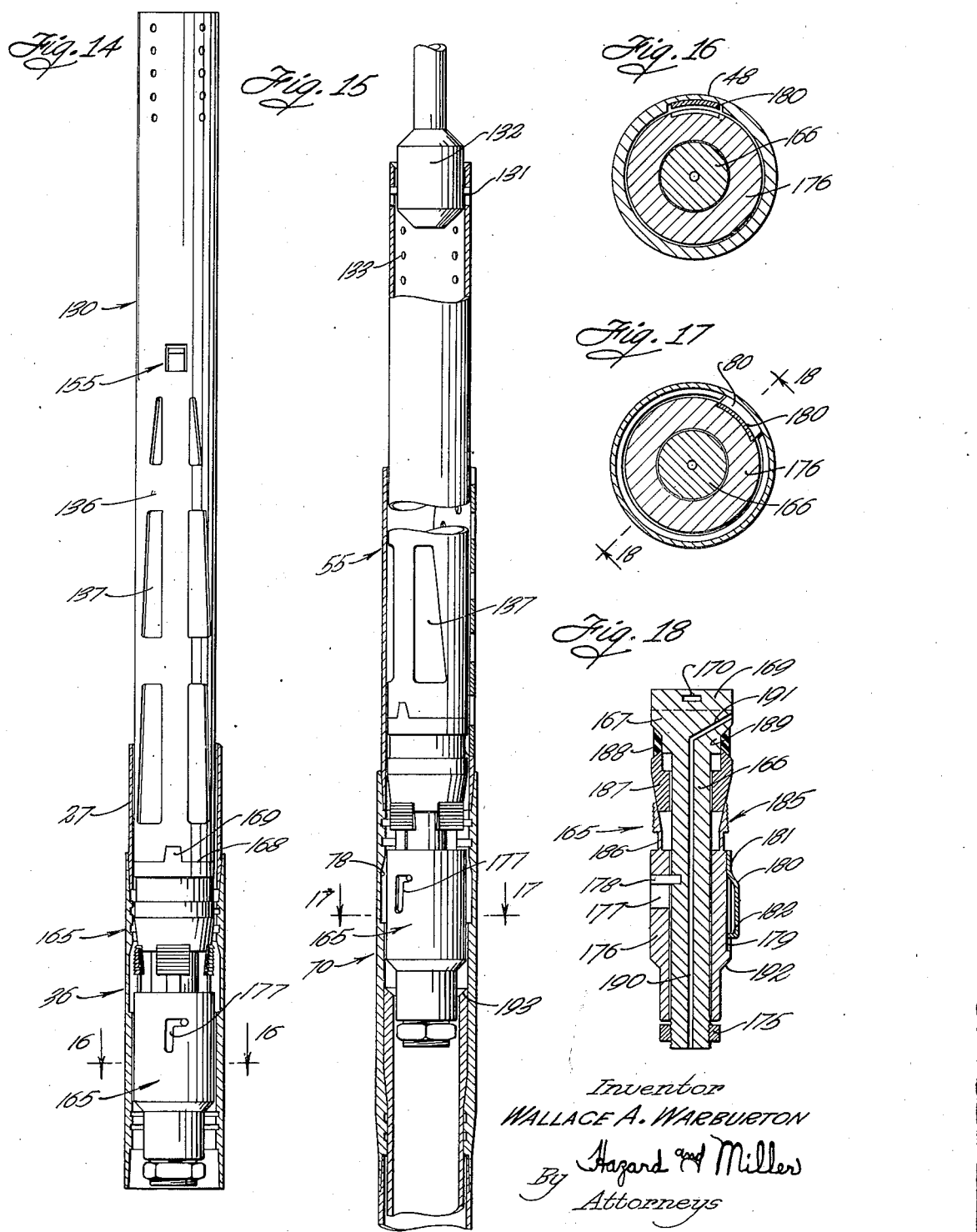

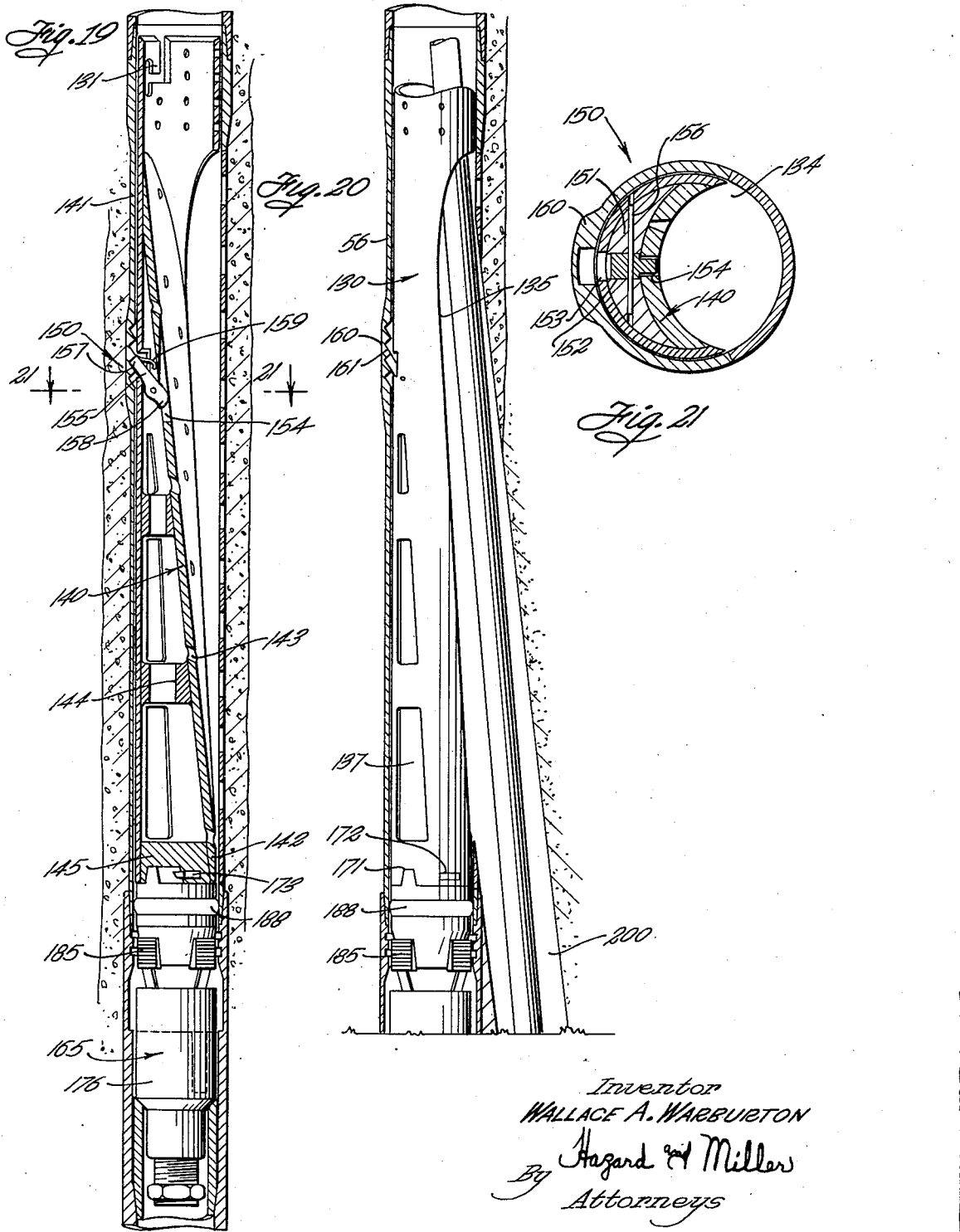

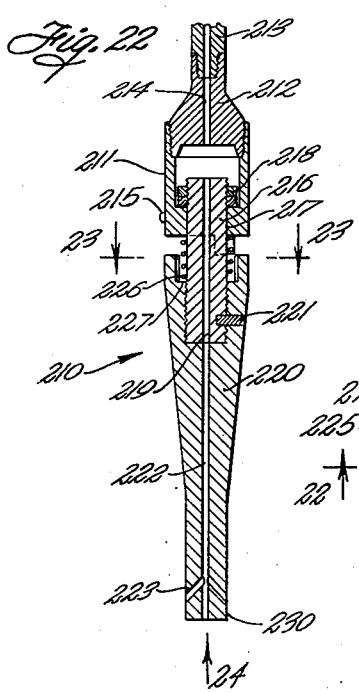
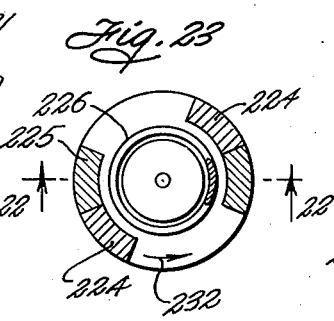
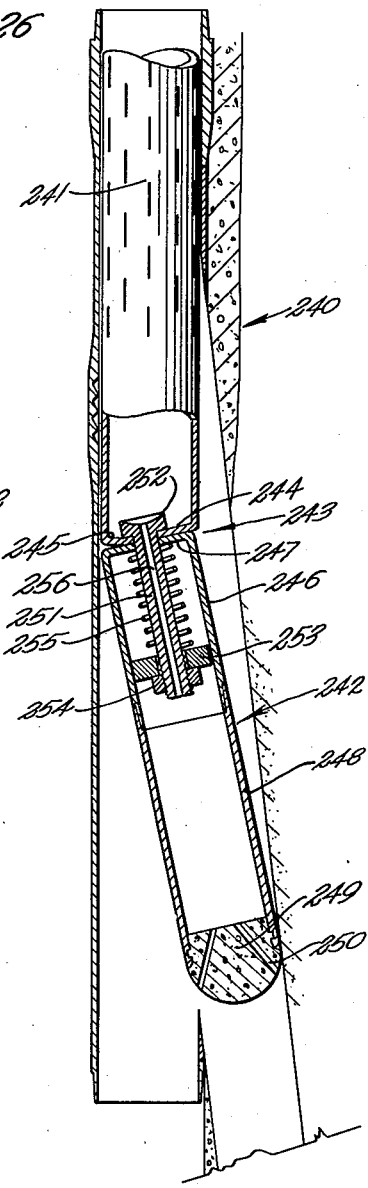
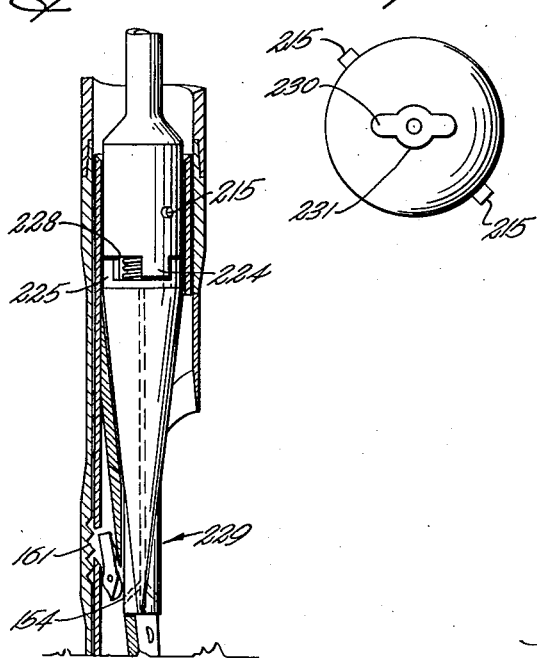

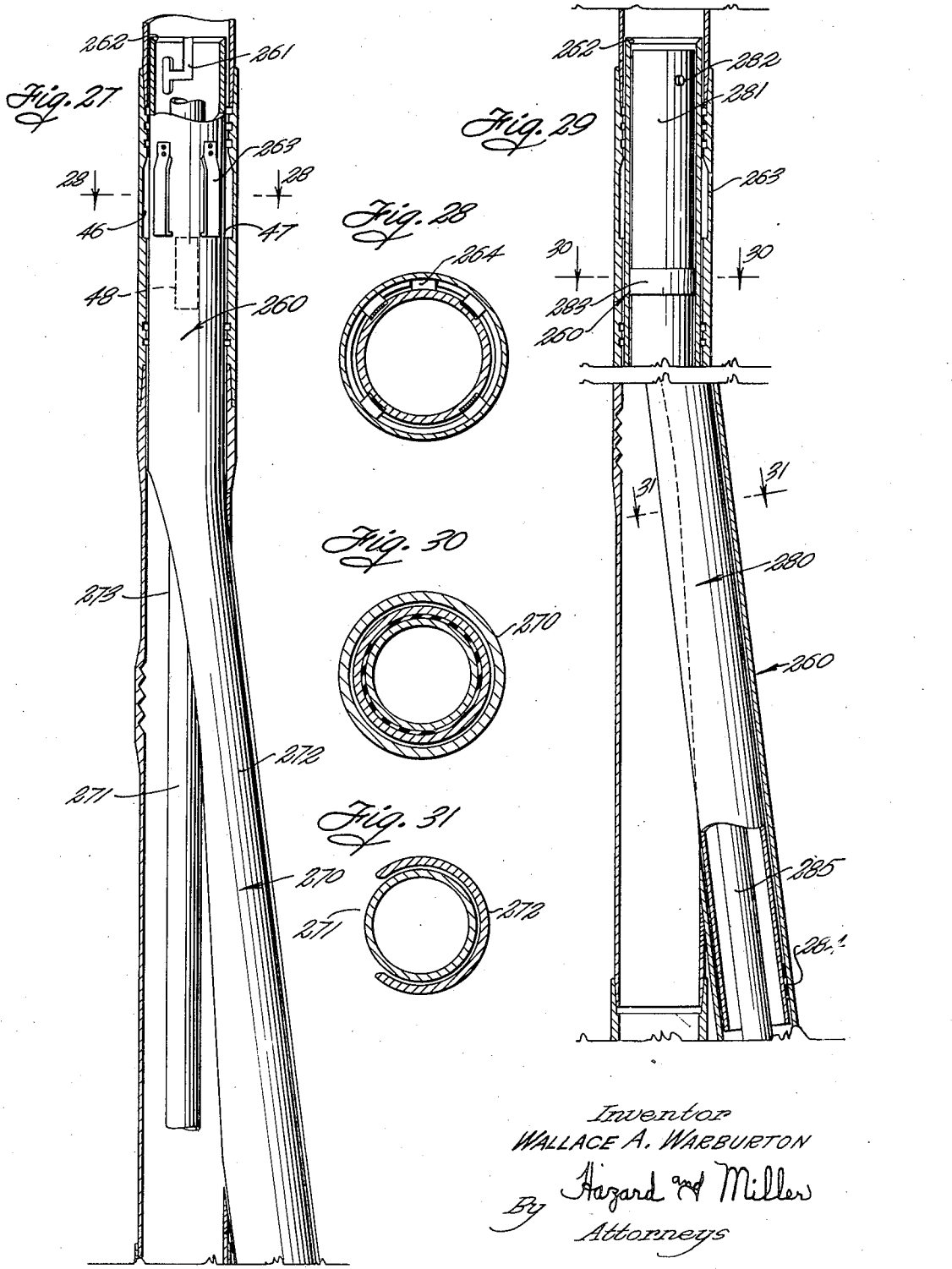

2,211,803

UNITED STATES PATENT OFFICE 2,211,803

METHOD AND EQUIPMENT FOR MULTIPLE WHIPSTOCK DRILLING AND LINING

Wallace A. Warburton, Bakersfield, Calif.

Application August 7, 1939, Serial No. 288,844

20 Claims. (Cl. 255—1)

My invention relates to equipment and method by which two or more whipstock type of drilling in deep wells such as oil wells may be accomplished in which the whipstock drillings are at different heighths above the bottom of the well. My invention also includes the liners and equipment for lining the whipstock holes.

Whipstock type of drilling and drilling equipment is in quite common use and practice however by my invention from a main well bore I may produce two or more lateral whipstock drilled holes which may be lead into the same oil bearing formation or into different formations at different depths. Obviously a well having two or more whipstock holes from which oil may be withdrawn either from the same or different oil formations is a decided advantage and improvement in oil well work and producing oil. However it is obvious that the present type of equipment is not at all suitable for multiple whipstock drilling. My invention therefore involves a series of correlated tools or pieces of equipment by which the multiple whipstock drilling may be accomplished and the whipstock drilled holes properly lined with a liner, thus equipping the wells in condition for producing oil. My invention may therefore be considered as involving certain sub or correlated features. Presuming that it is desired to undertake whipstock drilling from a straight or vertical hole already drilled, it is necessary to provide equipment for setting the whipstock, therefore one feature of my invention includes a series of tools which may be lowered into the well. These include a lower whipstock shield with a lower whipstock or whipstock plate mounted therein and the shield including a readily drillable side wall, this being of metal such as aluminum alloy through which drilling may take place, the drill being guided outwardly by the lower whipstock.

However, to obtain a proper setting and sufficient rigidity of the equipment, this combination lowering, setting and cementing equipment for the upper and lower whipstock shields includes a cementing valve by which after placement of the tool in the well cement may be forced outwardly to form a body of cement between the tool and the wall of the hole drilled in a former operation. In addition I provide a central pipe which communicates from for instance a string of drill pipe to the lower whipstock shield by which cement is carried through to the lower shield, then through a bottom valve cement is discharged through a bull-nose attachment at the bottom of the equipment. Also on account of having the whipstock plate and the drillable whipstock shield for the lower whipstock hole perforated, the lower portion of the assembly is cemented. The upper whipstock shield tube has a series of perforations in the drillable side wall through which cement may enter from the outside, thus filling this portion of the tool, that is, the upper whipstock shield section, with cement and embedding the cement pipe with a supporting structure therefor.

My invention also includes certain sections with interior machined parts such as supporting shoulders and guide slots which are isolated from the cement by having chambers between upper and lower diaphragms filled with oil, thus no cement can enter these parts where it would become attached to the machined interior portions and being difficult to remove.

After this main lowering, setting and cementing tool is in position, it is drilled out, the drill being of such a type that it cuts the upper cementing valve, the central cement tube or pipe with its supporting braces and drills through the upper and lower diaphragms of the oil chambers. The drilling is carried through to a position above the lower whipstock shield with the whipstock plate therein, then a smaller sized drill is used which guided by the lower whipstock plate drills the side wall of the lower whipstock shield and starts the lower whipstock hole. This may be continued as desired.

My invention also includes a special construction of lower whipstock liner with an interacting setting connection with a portion of the main tool together with the detail construction for setting this bottom or lower whipstock hole liner.

My invention also includes an upper whipstock assembly with a packer and the equipment for lowering and setting this packer. It is in the setting of the packer that the machined parts of the lower oil chamber above the lower whipstock shield come into use and the packer becomes seated on the upper end of the lower whipstock liner. By use of the packer and the firm support obtained thereby together with its seating on the lower whipstock liner, a firm support is obtained for the upper whipstock. My invention includes various detail features by which this upper whipstock may be properly oriented so that the sloping whipstock face or plate is directed towards the drillable outside wall of the upper whipstock shield. These drillable shields are made in a special manner of readily drillable metal such as aluminum alloy properly held in place in an elongated somewhat oval shaped opening in the steel pipe forming the main body of the shield.

The upper whipstock involves certain details of a locking device which when the whipstock is set latches this from upward movement, the latch however being of a type that it may be released by a special pulling tool. This upper whipstock also has the characteristics of having apertures or openings through which it may be flushed by the discharge of slushing liquid through a suitable tool and thus remove all of the sand or cuttings or other material which would otherwise tend to "freeze" the upper whipstock in the whipstock shield. The packer by preventing entrance of sand or other material also provides an equipment which may be readily removed by a proper tool after drilling the upper whipstock hole, at least to a sufficient depth to clear the whipstock shield and the equipment cemented in the well.

A rather important feature of my invention relates to a pulling and flushing tool for the upper whipstock. This is arranged to be lowered in the well by pulling rods or the like and may be oriented to release the latch which locked the upper whipstock from removal. The tool also engages the upper whipstock so that by an upward pull it may be removed. Coupled with this I provide the pulling tool with slushing ducts for discharge of flushing water, thus clearing the upper whipstock and the adjacent portion of its packer from sand or other cuttings facilitating the removal of the upper whipstock.

Another feature of my invention relates to the physical construction and the equipment for setting the upper whipstock hole liner. This at its upper end has a device by which it may be lowered by a liner setting tool. A knuckle joint is provided at the lower end, this having an automatic spring actuated device for diverting the lower end or guide portion into the lateral whipstock hole and thence guide the liner laterally into this upper hole drilled by use of the upper whipstock.

In view of the fact that it is necessary to lower tools past the upper whipstock hole to lower parts of the well such as the lower whipstock hole, the liner for the upper hole is provided with a cut-out section facing inwardly which has somewhat the same contour only in reverse of the opening left after drilling out the side wall of the whipstock shield in drilling the upper whipstock hole. To obtain the proper centering and thus the orientation of the cut-out section of the upper whipstock liner, I provide special guiding and seating tools which operate in the machined interior structure of the upper oil chamber, these being undamaged in the operation of drilling out the cement on account of there being no cement attached to any of the interior parts of the oil chambers.

Another feature of my invention relates to a blank liner which may be inserted in the upper whipstock liner, blocking off the vertical passage to the lower part of the well and hence diverting tools solely to the upper whipstock hole. This blank liner is provided with rubber rings or gaskets which form a temporary seal with the upper whipstock liner but are of such a nature that this blank liner may be removed.

My invention is illustrated in connection with the accompanying drawings. In the description, certain drawings are grouped.

Figs. 1 to 10 inclusive are for the main tool for lowering, setting and cementing upper and lower whipstock shields, in which:

Fig. 1 is a vertical diametrical section, certain interior parts being shown in elevation including a water shut off unit.

Fig. 2 is a similar section continued downwardly indicating the upper whipstock shield and the lower keyway.

Fig. 3 is a side elevation partly broken away of a lower portion of the tool continuing from Fig. 2 illustrating the lower whipstocking shield and bull-nose attachment.

Fig. 4 is a transverse section on the line 4—4 of Fig. 1 looking upwardly in the direction of the arrows.

Fig. 5 is a horizontal section on the line 5—5 of Fig. 1 looking downwardly in the direction of the arrows illustrating the cementing and the cement filling.

Fig. 6 is a horizontal section on the line 6—6 of Fig. 1 in the direction of the arrows through a closed oil containing chamber having keyways.

Fig. 7 is a horizontal section on the line 7—7 of Fig. 2 illustrating the upper whipstock shield embedded in cement to be drilled out.

Fig. 8 is a section taken on the line 8—8 of Fig. 2 in the direction of the arrows through a lower oil filled chamber having a lower keyway.

Fig. 9 is a horizontal section on the line 9—9 of Fig. 3 in the direction of the arrows showing a portion of the lower whipstock and the drillable whipstock shield.

Fig. 10 is a schematic elevation showing an assembled view of the tool of Figs. 1 to 9 installed in a well and cemented in place prior to drilling for whipstock drilling.

Figs. 11 to 13 inclusive are tools for drilling the cement filling and the lower whipstock hole and seating the lower liner therein, in which:

Fig. 11 is a vertical diametrical section with the drill and associated parts being shown in elevation in which the drill has passed through part of the structure illustrated in Fig. 2.

Fig. 12 is a similar section of a lower portion such as that shown in Fig. 3 at right angles to Fig. 3 with the drill for the lower whipstock hole illustrated as cutting through the lower whipstock shield, the section being taken on the line 12—12 of Fig. 9 in the direction of the arrows.

Fig. 13 is a vertical section partly in elevation showing the lower whipstock of Figs. 3 and 9 with the lower whipstock liner in setting position, such section being taken on the line 13—13 of Fig. 8.

Figs. 14 to 18 inclusive include the upper whipstock, the packer therefor and associated details, in which:

Fig. 14 is a vertical section showing part of the whipstock shield of Fig. 2 with the upper whipstock and packer in elevation as it enters the upper keyway.

Fig. 15 is a similar section of part of the upper whipstock shield of Fig. 2 with the upper whipstock and packer as it enters the lower keyway prior to setting on top of the bottom liner.

Fig. 16 is a transverse section on the line 16—16 of Fig. 14 in the direction of the arrows showing the portion of the tool in the upper keyway.

Fig. 17 is a transverse section on the line 17—17 of Fig. 15 in the direction of the arrows showing the tool as it enters the lower keyway.

Fig. 18 is a vertical section of the packer unit taken on the section lines 18—18 of Fig. 17 in the direction of the arrows.

Figs. 19 to 21 inclusive illustrate the locking and setting device for the upper whipstock and the upper whipstock drilling, in which:

Fig. 19 is a vertical section on the line 19—19 of Fig. 7 in the direction of the arrows after drilling the cement and illustrating the upper whipstock unit in vertical section, the locking device for the whipstocking being shown in vertical section and the packer being shown in elevation.

Fig. 20 is a section similar to Fig. 19 with the upper whipstock shown mainly in elevation and the upper whipstock shield drilled out by the upper whipstock drilling.

Fig. 21 is a transverse section on the line 21—21 of Fig. 19 taken in the direction of the arrows showing the locking device for the upper whipstock.

Figs. 22 to 25 inclusive illustrate the tool for removing the upper whipstock and a slushing fluid circulation tool, in which:

Fig. 22 is a vertical section on the line 22—22 of Fig. 23 of the upper whipstock removing tool and the slushing liquid circulating tool for the upper whipstock.

Fig. 23 is a transverse section on the line 23—23 of Fig. 22.

Fig. 24 is a view looking upwardly in the direction of the arrow 24 of Fig. 22.

Fig. 25 includes a section of the upper whipstock shield with the removing tool of Figs. 22 and 23 shown in elevation with the upper whipstock and its locking device being disengaged and the tool in position for liquid circulation.

Figs. 26 to 31 inclusive illustrate the knuckle joint for guiding the top or upper liner with the seating tools and blank shut off tool for the upper liner, in which:

Fig. 26 is a vertical section showing the upper whipstock lining and a knuckle joint in section for the top liner guiding this into the whipstock liner.

Fig. 27 is a vertical section illustrating part of the construction of Fig. 2 at right angles to such figure with a top liner completely seated and illustrating tools operating through the top liner to the lower whipstock and its liner.

Fig. 28 is a transverse section taken on the section line 28—28 of Fig. 27 in the direction of the arrows.

Fig. 29 is a section of the well similar to Fig. 27 showing however a blank liner and tool inserted in the upper liner to divert tools from the vertical hole and the lower whipstock to the upper whipstock liner.

Fig. 30 is a transverse section on the line 30—30 of Fig. 29 in the direction of the arrows.

Fig. 31 is a transverse section on the line 31—31 of Fig. 29 in the direction of the arrows.

As my invention involves equipment for multiple whipstock drilling together with the lining of the whipstock drilled holes and the method of operation, it is necessary to insert in a new well the whipstock shields including a lower or bottom whipstock and after this operation is completed, such equipment is cemented in place and therefore set the lower whipstock and the upper whipstock shields in the correct location for whipstock drilling. It is to be understood that a succession of whipstock and whipstock drilling may be used and accomplished above the lowermost, however in the equipment shown in Figs. 1 to 10 provision is only made for drilling two whipstock holes. My invention is first described as to the construction relating to Figs. 1 to 10 inclusive.

In this, in Figs. 1 and 10 I illlustrate a sub 11 or the equivalent which may be connected to a string of drill tubing or the like leading from the top of the well. Immediately below and attached to the sub I provide a cementing valve assembly 12. This includes a coupling 13 with annular corrugations on the inside with a body of cement 10 or equivalent drillable material 14 located therein. A valve cage 15 is embedded in the cement and has a spider (note Fig. 4) supporting the ball 17 of the valve allowing a space 18 for the downflow of a slushing fluid or the cement. There are lateral ducts and ports 19 for the discharge of the cement at the proper time. Below the valve cage I employ a tube suspending collar 20 also embedded in the cement 14, such cement body having ducts 21 communicating from the sub 11 to the valve and from the valve to the collar 20. A pipe 22 is connected to the collar 20.

A water tester equipment 25 is illustrated as attached to the lower end of the coupling 13 but this may be located at any place in the equipment forming my invention as illustrated in Figs. 1 to 10. The joint 26 and all the joints of the various connections of tubing and casing are preferably welded. This water tester employs quite a long pipe 27 with long vertical slots 28 for entrance of cement. A slushing fluid or cement pipe 29 is coupled to the pipe 22 and extends downwardly through the pipe 27. On account of this pipe being of comparatively light weight and having such large vertical slots 28, radial brace plates 30 (note Fig. 5) connect the pipe 27 to the pipe 29. These with the pipe 29 are of drillable material and subsequently removed.

Below the water tester and the pipe 27 I employ a pipe liquid chamber 35. This employs a pipe section 36 having a welded joint with the lower end of the pipe 27. This is provided with a thickened and internally ribbed or annularly grooved section 37 with a closure diaphragm 38 which employs a perforated disk 39 and a threaded thimble 40 with a body of cement 41 on opposite sides of the disk and embedding the threaded thimble. The pipe 29 is illustrated as threaded into this thimble. A lower diaphragm seal 42 is of the same general construction as the diaphragm 38 employing a similar thimble and there is a flow pipe 43 threaded into the thimble, thus extending through an oil chamber 44. An expansion valve assembly 45 employs a pipe extending through the composite disk and cement diaphragm to release oil on expansion due to the heat encountered in a well. Oil is filled into this space prior to the assembly of the tool. The purpose of using oil is so that no cement in the cementing operation flows into the chamber and hence the interior may be machined in the desired manner. For instance the pipe 36 is illustrated as having an annular recess 46 with a lower annular shoulder 47 and extending downwardly from this shoulder there is a vertical keyway groove 48, note Fig. 6, in Fig. 1 this being partly hidden by the pipe 43.

Next below the pipe liquid chamber 35 is an upper whipstock shield section 55. This employs a relatively long pipe 56 having a welded connection at its upper end to the lower end of the pipe 36. A stub pipe 57 is connected to a thimble of the lower diaphragm 42 and a continuation pipe 58 has a jointed connection to the pipe 57. There are a series of radial spacing places 59 centering the pipe 58 in the outer pipe 56. This outer pipe is of composite character and has a whipstock shield section 60 secured therein. This shield forms a segment of a circle, note Fig. 7, and is formed of preferably an aluminum or readily drillable alloy. It is to be noted that there is a vertical slot 61 formed in the steel or hard metal section 62 of the pipe 56. This opening is somewhat oval, having a curved upper end 63 and a curved and elongated tapered opening 64 at the bottom. The shield segment is provided with internal marginal ribs 65 (note Fig. 7) forming an interior lock, thus aiding in retaining the shield segment in position. The joining edges at the elongated slot opening 61 are held in any suitable manner. This shield section has a plurality of perforations 66 in the form of elongated slots for entrance of cement. The particular shape of the opening is to accommodate the drilling tools and whipstock drilling after inserting an upper whipstock.

Below the upper whipstock shield section 55 there is a lower or second oil chamber structure 70. This has a pipe 71, the upper end having a welded connection to the lower end of the pipe 56. There is an upper composite diaphragm 72 much the same as shown in Fig. 1. The lower portion has a pronounced inward taper 73 forming a tool seat hereunder described, the outer portion 74 being also somewhat contracted. The tapered tool seat 73 is located immediately above a lower composite diaphragm 75. The internal pipe 76 has a threaded connection to the thimbles of the diaphragm 72 and 75 and the lower end of the pipe 58 is also threaded to the thimble of the diaphragm 72, thus forming a continuous internal pipe connection through the oil chamber. Such chamber 77 is filled with oil and thus protects the internal machine features which include the annular recess 78 and a shoulder 79. There is also a vertical keyway groove 80 (note particularly Fig. 8). It is to be noted that this groove is offset from a vertical alignment with the upper groove 48 shown in Fig. 6.

The lower whipstock and whipstock shield assembly 85, note Fig. 3, has a relatively long pipe 86 with a welded connection at its upper end to the lower end of the pipe 71 below the composite diaphragms 75. This pipe is of a composite character having a steel or hard metal section 87 with an elongated opening 88 therein with a whipstock shield 89 fitted in this opening. The shield is of the same character as the upper whipstock shield 60, being held in place in the same manner, being of somewhat the same shape. There is also located internally a whipstock plate 90 with slots 91. This is on a slope diagonally across the interior of the pipe 86. The cross section of Fig. 9 illustrates substantially the midsection considered vertically. The lower end is in proximity to the lower portion of the whipstock shield 89 and the upper end at the side remote from the shield adjacent the top of the shield. This is for the purpose of deflecting the drilling tools used in whipstocking laterally to cut out the whipstock shield 89 and thus drill at a downward inclination. The whipstock plate is provided with a series of slots 91 to permit filling the whole interior of the structure with cement.

A bull-nose attachment 95 may be somewhat of standard character and is illustrated as having a tubular coupling section 96 welded to the lower end of the pipe 86. This has a cement body 97 therein and a valve 98 which includes a metal valve cage 99, a seat 100 and a ball plug 101, there being an opening through the cement to the valve. This valve assembly is somewhat the same as the cement discharge valve 15 at the top of the structure and permits discharging cement downwardly. It will be noted that the internal pipe for conducting the cement downwardly has its lower end 87 terminating at the diaphragm 75 but the cement forced downwardly in the lower whipstock shield 85 discharges through the perforations of the whipstock plate. Also there is a discharge past the valve ball 101.

After the tool as above described in Figs. 1 to 9 is lowered in a drilled hole to the desired depth, a cementing operation is then carried on which fills the annular space between the assembly of external pipes above described and the inside of the well bore as shown in Fig. 10. The cement also fills the interior of the structure as illustrated in Figs. 4 to 9 except that at the oil chambers shown in cross section in Figs. 6 and 8 there is no cement but a body of the oil which as above mentioned, has been filled into the chambers when the tool is assembled. It will be noted that in the illustration of Fig. 10 the lower and upper whipstock shields are shown at right angles, one to the other, but it is obvious that they may be a less angular turn apart and as aforementioned, more than one upper shield may be utilized.

The next operation is to drill out the cement and the interior structures at the places desired and after this is done perform the whipstock drilling utilizing the lower whipstock plate, the tools and this operation as illustrated in connection with Figs. 11 to 13. A special drilling bit 110, Fig. 11, is then utilized. This is lowered in the well by the proper sized string of drill pipe 111. The bit has special cutting tools 112 positioned at an angle and a central tool 113, which drill through the cementing valve assembly 12, the tools being specially designed to cut the metal parts of the valve cage, valve bore, etc., thus removing the metal structure shown in section in Fig. 4 and also the cement. The tool drills downwardly through the water tester structure 25 removing the cement and also the radial plates 30 and the pipe 29. It next drills through the upper diaphragm structure 38 removing the cement and the metal parts and thus enters the upper oil chamber structure 35. As there is no cement in the space occupied by the oil, the drilling tool does not damage the interior surfaces of this section, thus leaving the recesses 46, the shoulder 47 and the keyway 48 intact. The lower diaphragm structure 42 is then completely drilled through. In a further operation the upper whipstock shield is completely drilled clear of cement, the pipe 58 being drilled through and also the bracing plates 59. The drilling continues through the oil chamber structure 70 removing the upper composite diaphragm 72, but not the diaphragm 75 as the tapered seat 73 contracts the internal diameter of the outer pipe slightly less than the diameter of the tool 110.

The next step is illustrated in Fig. 12, the bit 110 having been removed from the well and a smaller sized bit 120 of the same type lowered through the equipment already drilled clear of the cement and the interior pipe and bracing bits. This smaller bit continues first a vertical drilling, removing the remainder of the pipe 76 and drilling through the lower composite diaphragm 75. It then enters the upper end of the lower whipstock shield 85, removing the cement. The drilling continues and the bit 120 is thus whipstocked to one side by the lower whipstock plate 91, the diagonal position of this being clearly illustrated in Fig. 12, although the pipe 86 may be much longer in proportion to its diameter than illustrated. The bit 120 thus drills out the whipstock shield 89 which is made of soft metal such as an aluminum base alloy. When the bit is clear of the cement and into the normal ground formation the type of bit may be changed and the drilling continued to the desired depth, the drill then being removed. The next step is shown in Fig. 13 in which a whipstock hole liner designated by the assembly numeral 125 is lowered in the normal manner. When the bottom end reaches the whipstock plate 91 it is deflected laterally, the lowering being continued until the tapered outside surface 126 engages the inside taper surface or seat 73. These two interacting tapers thus suspend the whipstock liner in the whipstock hole. This liner has conventional bayonet type slots 127 utilized in lowering and also in pulling the liner. The liner is illustrated as having the usual perforations.

In the next sequence of operations the equipment illustrated particularly in Figs. 14 to 21 is utilized for lowering and seating the upper whipstock to force the whipstock drilling through the upper shield 60. In Figs. 14 and 15 the lower portion of the pipe 27 is illustrated and the pipe 36 attached thereto, this part having the annular recess 46, the shoulder 47 and the vertical keyway 48. In this equipment the upper whipstock tool 130 has at its upper end slots or grooves 131 utilized in conjunction with a conventional liner seating tool designated 132, this being lowered in an ordinary and conventional manner. There are a series of perforations 133 adjacent the top of the whipstock. This whipstock is cylindrical with a full surface of metal at the upper portion but with an open portion designated 134 on what is termed the front. The edge 135 of this open section is illustrated in the profile of Figs. 19 and 20. The back 136 and continuing around the sides has a series of elongated and tapered openings 137. A substantial whipstock plate 140 extends downwardly diagonally in the whipstock tool, the upper end being connected at the back as indicated at 141 and the lower end at the front of the whipstock tool is indicated at 142. This plate also has a series of perforations 143 and is made of the usual cross sectional curvature as indicated in Fig. 21. Stiffening spiders 144 connect the back 136 and the whipstock plate, thus forming openings connecting vertically back of the whipstock plate. A heavy and substantial base block 145 (Fig. 19) forms the bottom of the whipstock proper and is secured to the back and to the whipstock plate preferably by welding.

The whipstock is provided with a latch assembly designated 150 which requires a substantial latch block 151 (note Fig. 21) this having a vertical slot 152 therein which is centered relative to a vertical slot 153 in the back 136 of the whipstock and it is also centered in regard to a vertical slot 154 in the whipstock plate 140. The latch dog 155 is shaped in vertical profile as illustrated in Fig. 19, there being a pivot pin 156 of Fig. 21 and extending through the latch block 151 and forms the pivot. This latch dog has a thrust end 157 preferably squared on the end. The front or release end 158 is curved on its lower end, the curve being convex and facing towards the center of the whipstock tool. A spring 159 has one end attached to the end portion of the latch dog 155 and has a resilient free portion positioned to thrust against the back of the whipstock plate 140, thus urging the nose end 158 outwardly through the slot 154 to a position in front of the whipstock plate. For use of this tool there is preferably an enlarged or bossed portion 160 on the back of the whipstock tube 56. This has a series of ratchet steps 161 which receive the thrust end 157 of the latch dog. As the whipstock tool is lowered the thrust end is forced in a sequence in the upper tooth or notch and successively into the lower ones as the equipment is lowered.

For setting the whipstock I utilize a packer assembly identified by the numeral 165 of which the details are shown in Fig. 18 in a vertical section, there being a central plunger 166 with a head 167 having a horizontal or flat top 168 with a lug 169 extending thereabove and completely across the head. This lug is provided with a transverse perforation 170. The block 145 and the portions of the whipstock back and whipstock plate is of a complementary shape having a transverse notch 171 to receive the lug 169 and also having a cross perforation 172 in which a pin 173 is inserted and fitted, thus attaching the packer to the lower end of the whipstock.

The packer may be somewhat of a conventional type however that illustrated has a nut 175 threaded on the lower end of the plunger 166, a sleeve 176 is slidable on the plunger and has an angle slot 177 in which fits a transverse pin 178 secured to the plunger. The opposite side of the sleeve has a vertical recess 179 with a guide spring 180 having its upper end 181 secured to the sleeve and its lower end 182 operating in the recess.

Locking slips 185 are attached by stems 186 to the sleeve 176 and on their inside surface wedge against a wedging collar 187, also slidable on the plunger. The head 167 and the upper edge of the collar 187 have complementary beveled faces to receive the rubber expandible packing ring 188. This ring normally seats on the neck 189 of the head. Extending through the plunger there is a flushing duct 190 which has a lateral offset 191 to one side of the head.

When the upper whipstock tool 130 is lowered the slips are contracted and also the rubber ring is contracted so that this portion passes down freely in the bored out equipment shown in Figs. 1 and 2. The tool is manipulated so that the guide spring 180 engages in the vertical keyway 48, note Figs. 6 and 16 and this being located as shown in Fig. 1 in the pipe 36 of the upper oil chamber. The engagement of the spring guide in this keyway 48 thus apprises the driller or tool handler of the exact depth in the well of the upper whipstock assembly but however the whipstock is not lined up with the front facing properly towards the upper whipstock shield 60, note Figs. 2 and 6. The equipment is then lowered with the packer assembly contracted until it passes through the upper whipstock shield section 55, note Figs. 2 and 15 and the spring 180 enters the annular recess 78 of the oil chamber structure 70. The operator knows the exact drop to make to bring the packer into this new position. The assembly is then rotated 45 degrees bringing the spring 180 of the packer into alignment with the groove 80, note Figs. 8 and 17. The assembly stem with the packer contracted is then lowered until the beveled end 192 of the sleeve 176 contacts the beveled seat 193 on the upper end of the lower whipstock liner 125 (note Figs. 13 to 15 and 19). The packer and the assembly can thus be lowered no further except for the yield of the packer. The assembly is then rotated in such a direction as to move the pin 178 out of the horizontal part of the L shaped slot 177 to the vertical part. Then on a downward reaction the packer is expanded in the normal manner forcing the slips into engagement with the outer structure or pipe 71 of the oil chamber structure 70. In the same operation the rubber packing ring 188 is expanded and forms a fluid and sand tight seal, thus preventing any sand, cement or liquids from flowing upwardly or downwardly to the lower whipstock liner. This action of setting brings the latch assembly 150 into its correct operating position and there is enough yield in the rubber ring to allow the locking of the abutment end 157 of the latch dog 155 in one of the ratchet steps 161. This brings the equipment to the position shown in Figs. 19 and 20. The lowering tool or liner setter 132 is then removed leaving the upper whipstock in its proper position.

The next operation is the upper whipstock drilling in which the string of drill pipe operates a tool similar to the tool 110 and 120 of Figs. 11 and and 12 and forms the whipstock hole 200 of Fig. 20. This tool cuts through the whipstock shield 60. The hole may be carried to the desired depth and either into the same or to a different oil bearing strata or formation from that of the lower whipstock hole. This upper whipstock hole then has a liner placed therein following the conventional procedure: However, it is necessary to remove the whipstock before placing a liner in the upper whipstock hole as hereunder described.

As above mentioned, after completion of the drilling of the upper whipstock hole, it is necessary to remove the upper whipstock assembly which has been described in detail and to accomplish this, the whipstock removing tool is used, this being illustrated in Figs. 22 to 24, such being a special type of tool designated by the assembly numeral 210 and has a cup type of head 211, the upper end having a threaded connection to a coupler 212 and this to a tubular pulling rod 213 by which the tool is lowered and the whipstock is pulled. The coupler has a slushing duct 214 aligning with the opening in the rod 213. The head has projecting pins 215 utilized to engage the slots or grooves 131 which have been used with the conventional liner seating tool, the same slots being utilized to pull the upper whipstock. A substantial cylindrical bar 216 is slidable through a complementary opening 217 in the base of the cup 211 and has nuts and lock nuts 218 at the top. A slushing duct 219 extends through this bar and the bar at its lower end is screw threaded into the latch releasing end piece 220, there being a lock pin 221 securing the bar 217 and the end piece 220 together. A slushing duct 222 extends downwardly through the end piece discharging at the bottom and also through lateral ports 223. There are complementary diametrical lugs on the head and the end piece, the lugs on the head being indicated at 224 and on the end piece 225. A stiff coiled compression spring 226 fastens in complementary recesses 227 in the end piece and 228 in the cup head 211, these recesses being positioned inside of the lugs, the purpose being when the tool is inserted to retain the end piece in a downward position as shown in Fig. 22. The lower portion 229 of the end piece has a pair of diametrically opposite fins 230, the remaining portion 231 being of lesser diameter than part of a circle. The purpose of the fins are to be guided in the slot 154 of the whipstock plate 140, this being an elongated vertical slot as shown in Figs. 19 and 25.

The pulling tool 210 operates substantially as follows: the spring 226 is given a torsional twist so that it has a normal function to rotate the lower part in reference to the head 211 as well as maintain these spaced apart as shown in Fig. 22. This retains the complementary lugs 224 and 225 in a contiguous touching position as shown in Fig. 23. This position located the projecting pins 215 and the fins 230 in the position shown in Fig. 24. Thus when the tool is lowered and the projecting pins engage in the bayonet type slot 131 of the upper whipstock assembly, note Fig. 19, and enters the vertical open part of such slot, the fins 230 will be directly aligned with the slot 154 in the whipstock plate 140. Then when the tool is forced down and rotated in the direction of the arrows 232, the projecting pins 215 follow the horizontal part of the slot 131, thence on an upward pull on the rod 213 move into the upper closed portion of the slot and are thus in a position for lifting the upper whipstock structure.

As above mentioned, this tool also has the slushing duct connection therethrough so that when the whipstock is gripped and unlatched, a flow of circulating fluid may be developed. Due to the fact that the whipstock plate 140 has a series of apertures in drilling the whipstock hole the portion back of this whipstock plate may have been filled with sand or cuttings from the well. The flow of the slushing fluid downwardly washes such material out from the interior of the whipstock assembly and releases any sand or material which would tend to resist the upward pull and release of the whipstock and its packer. Presuming that the tool of Figs. 22 to 25 does not release the latch dog 155, the pintle 156 is made of metal which will readily shear on the upward pull developed to release the whipstock. The latch dog and the portion of the pin severed may then drop downwardly through the openings in the stiffened spiders 144 as the sand or other material is washed out. At any rate the latch dog is either mechanically released by the releasing tool or rendered ineffective to prevent the upward withdrawal of the upper whipstock. While the slushing action is maintained the upper pull with or without a jerking action is continued, this releasing the packer designated by the assembly 165 and hence permits upward movement in the well. It will be noted that the slushing ducts 190 and 191 in the packer, note Fig. 18, will function to allow a downward flow of the slushing water through the packer and when the packer is set this also relieves any gas pressure developing in the lower part of the well. Thus after release of the whipstock and the packer the complete whipstock and packer assembly may be raised to the top of the well. This leaves the upper whipstock shield with the shield proper, element 60, completely removed and there being a lateral opening leading to the upper whipstock hole.

The next procedure is to lower a liner of a particular character especially at its upper end, into the upper whipstock hole, this being of a character to allow tools to pass downwardly in the main vertical part of the hole to the lower whipstock hole and provision is also made for inserting a removable whipstock liner guide to divert tools to the upper whipstock hole, these various tools being illustrated in Figs. 26 to 30 inclusive.

Dealing first with Fig. 26, this illustrates an upper liner knuckle joint tool designated by the assembly numeral 240. The lower portion of a liner is indicated at 241, the guide end 242, these being connected by the knuckle joint 243. This knuckle joint includes a bottom beveled end 244 of the lower portion of the liner 241, such being somewhat rounded at the lower edge portion 245. The guide end 242 has a sleeve 246 with a closure head plate 247, this head plate being at right angles to the axis of the sleeve. A guide tube 248 of any desired length is connected to the sleeve and makes an extension. This has a cemented bull-nose 249 at the bottom with outlet ducts 250 for flow of slushing fluid. A tubular bolt 251 extends through complementary openings in the bottom 244 of the liner and the end plate 245 of the sleeve 246. The bolt has a suitable head 252. The lower end passes through a transverse diaphragm or spider 253 which is loosely mounted on the bolt 251 and retained in place by the nut 254. A compression spring 255 exerts a thrust against the closure head plate 247 and the spider 253, thus retaining the sleeve 246 in close relationship with the lower end 244 of the lower portion of the liner. As above mentioned the bolt is tubular and has a slushing duct 256 therethrough.

In the operation of this tool of Fig. 26, the liner equipment is lowered in the well by a suitable liner setting tool. The operator knows the depth to which this should be lowered and when this depth is approached the tool is slowly rotated. Manifestly when the tool is passing downwardly in the vertical portion of the well hole, the guide end 242 is in axial alignment with the liner 241 however when the whipstock hole is reached, this in rotation whips off to one side and in the rotation will come to the position shown in Fig. 26, when it enters the opening in the upper whipstock shield where the shield proper has been removed and into the whipstock hole and thus guides the liner into the upper whipstock hole.

The details of the completion of the setting of the upper whipstock liner are presented in Figs. 27 and 28. The top portion of the liner is designated by the numeral 260 and this has bayonet type of slots 261 at the upper end to be engaged by a liner setting tool, these being of the same type as indicated at 127, Fig. 13 and 131, Fig. 19. The liner has a beveled edge 262 at the top. It is provided with a plurality of seating springs 263 and a guide spring 264. On lowering the upper whipstock liner, when the lower spring 264 enters the recess 46 of the upper liquid chamber 35, the tool may be rotated or manipulated in the conventional manner to bring this lower spring into alignment with the vertical guide groove 48. This locates the upper whipstock liner with the proper orientation and it may then be lowered until the upper springs 263 seat on the annular shoulder 47. It is important that this upper liner be seated with the proper orientation as it is open on the inside. The liner section 270 which aligns with the opening 61 in the upper whipstock shield left after removal of the aluminum or composition shield 60 is of a partial cross section and not a complete circle. The portion facing inwardly is open as indicated at 271, the outer portion 272 is part of a circle, however the opening 271 facing inwardly is smaller than the opening 61 in the whipstock shield assembly 55 but is of the same typical contour. The purpose of this is to allow tools and other equipment to be lowered through the upper part of the whipstock liner. A string or line of piping or rods being indicated at 273, Fig. 27. Thus with these tools lowered past the upper whipstock hole and its liner, work may be done in the lower part of the bore and in the lower whipstock hole and where desired these tools could be sucker rods operating a sucker rod type of pump in the lower whipstock liner.

Figs. 29, 30 and 31 illustrate the use and construction of a blank liner designated by the assembly numeral 280. This is cylindrical when lowered into the equipment and is intended for the purpose of closing off the opening 271 of the upper whipstock liner 260 in which the section 270 extends through the opening formed by cutting out the upper whipstock shield and drilling the upper whipstock hole shown in Fig. 27. The purpose of this blank liner is to fit in the liner 260 and thus guide tools to the upper whipstock hole. Such liner has the characteristics of the upper portion 281 preferably having diametrically opposite pins or studs 282 by which such liner is lowered into the well, the studs engaging and fitting in the bayonet type slots 261 of the liner 260, note Fig. 27. On account of the opening 271 facing inwardly of the liner section 270, this opening or space is less than half the diameter, therefore when the liner 280 is lowered it is guided downwardly in the liner 260 and extends outwardly into the upper whipstock bore. The blank liner is provided with an upper rubber packing or collar 283 and a lower rubber packing ring 284. These rubber packers or rings form a sufficiently tight seal between the blank liner 280 and the upper whipstock liner 260 to prevent packing of sand or the like between these two liners, therefore when the blank liner is installed, rods, tubes or the like indicated at 285, Fig. 29, may be lowered in the well and guided by the blank liner to the upper whipstock bore and therefore drilling or other work carried on in this upper whipstock bore.

The water tester 25 is not necessary in all cases but certain Government requirements necessitate the use of some type of a water tester. A feature of this construction is that when cementing the complete water tester is filled on the inside with cement and the cement also fills the space between the tester and the wall of the well. Therefore, when the interior cement and the pipe 29 is drilled out it leaves cement at the long slots 28. Hence, if there is a water pressure in the formation, such water is forced through the cement and through these slots 28 into the inside of the water tester. Should the concrete be too thick this may be shattered by a gun perforator if necessary. If water seeps into the water tester it is removed by a standard equipment now utilized. I have shown the water tester assembly 25 in the assembly as in Figs. 1, 2 and 3, but of course, as above mentioned, it may be located any place in the equipment or may be located below the shoe 95. However, the operation is substantially the same.

Another extensive field for the use of my invention is to recondition old wells. Such wells usually have a casing with the liner fitted in the bottom of the casing and the well has been tested for a water shutoff. In utilizing my invention for such equipment, a section of the old liner below the casing is cut out, thus leaving a well opening in which my equipment may be lowered. However, in this case it is not necessary to use the water tester 25 nor the cementing valve assembly 12. Therefore, the equipment as shown in Figs. 1, 2 and 3 with the upper liquid chamber 35 forming the upper element is lowered through the old well casing by a liner hanger with drill pipe, the liner hanger being used to suspend the structures forming my invention below the old casing. Cement is then forced through the equipment taking the place of the cut out liner, filling the cavities completely, and this operates to center the equipment in alignment with the lower portion of the old well. Then, when the cement is properly set, the cement inside of the equipment is drilled out in the manner above described, and the operation carried on for drilling and setting the lower and upper whipstock liners as above described. It will thus be seen that without practically any change of the equipment it may be utilized in the field of old well reconditioning by multiple whipstocking or when new wells are drilled to have the multiple whipstock construction.

Various changes may be made in the details of the construction without departing from the spirit or scope of the invention as defined by the appended claims.

I claim:

1. In a method of whipstock well drilling comprising inserting a cementing tool having a lower whipstock plate, a lower and an upper confined liquid chamber in a well hole, cementing such tool in the well hole with cement entering the tool except the confined liquid chambers, drilling the cement out of the tool to the lower confined oil chamber, then drilling a lower whipstock hole diverted by the whipstock plate, then lowering a lower whipstock hole liner and suspending such liner in the former lower confined liquid chamber.

2. In a method of whipstock well drilling comprising inserting a cementing tool having a lower whipstock plate, a lower and an upper confined liquid chamber in a well hole, cementing such tool in the well hole with cement entering the tool except the confined liquid chambers, drilling the cement out of the tool to the lower confined oil chamber, then drilling a lower whipstock hole diverted by the whipstock plate, then lowering a lower whipstock hole liner and suspending such liner in the former lower confined liquid chamber, lowering an upper whipstock with a whipstock plate and supporting such upper whipstock on the lower whipstock hole liner, then drilling an upper whipstock hole, the drill being diverted by the upper whipstock plate, then removing the upper whipstock and lowering an upper whipstock liner and suspending such liner in the former upper confined liquid chamber.

3. In a method of whipstock well drilling comprising inserting a cementing tool having a lower whipstock plate, a lower and an upper confined liquid chamber in a well hole, cementing such tool in the well hole with cement entering the tool except the confined liquid chambers, drilling the cement out of the tool to the lower confined oil chamber, then drilling a lower whipstock hole diverted by the whipstock plate, then lowering a lower whipstock hole liner and suspending such liner in the former lower confined liquid chamber, lowering an upper whipstock with a whipstock plate and supporting such upper whipstock on the lower whipstock hole liner, then drilling an upper whipstock hole, the drill being diverted by the upper whipstock plate, then removing the upper whipstock and lowering an upper whipstock liner and suspending such liner in the former upper confined liquid chamber, lowering a blank liner and guiding such blank liner in the upper whipstock hole to close an inwardly facing opening leading to the lower whipstock hole and liner, suspending the blank liner in the upper whipstock liner, then operating tools through the blank liner and the upper whipstock liner in the upper whipstock hole.

4. In a method of whipstock well drilling comprising inserting a cementing tool in a well, the tool including a hollow water tester with elongated slots, a cement valve, a lower whipstock plate, a lower and an upper confined liquid chamber each with tool supporting devices in the chambers, cementing the tool including the water tester in the well hole, the cement entering the tool except the confined liquid chambers, drilling the cement out of the water tester and the tool, making a water test in the water tester, then drilling a lower whipstock hole diverted by the whipstock plate, further lowering a lower whipstock hole liner and suspending such liner in the former lower confined liquid chamber.

5. In equipment for multiple whipstock drilling, a cementing tool having a lower inclined whipstock plate and a readily drillable shield on one side of the plate, said tool having liquid chambers defined between upper and lower diaphragms, the tool having means to discharge cement into the tool except for the confined liquid chambers and to cement the tool into the well hole, the interior of the tool having the characteristics of being drillable, the said diaphragms being drillable whereby a drill may be diverted by the lower whipstock plate and thereby drill a lower whipstock hole.

6. In equipment for multiple whipstock drilling, a cementing tool having a lower inclined whipstock plate and a readily drillable shield on one side of the plate, said tool having liquid chambers defined between upper and lower diaphragms, the tool having means to discharge cement into the tool except for the confined liquid chambers and to cement the tool into the well hole, the interior of the tool having the characteristics of being drillable, the said diaphragms being drillable whereby a drill may be diverted by the lower whipstock plate and thereby drill a lower whipstock hole, the confined liquid chamber having means for suspending a liner and a lower whipstock hole liner inserted in the lower whipstock hole and suspended in a former confined liquid chamber by the said suspending means.

7. In equipment for multiple whipstock drilling comprising in combination a tubular cementing tool having means for attachment to a drill tubing sub and including a tubular structure having an upper and lower confined liquid chamber, each chamber being defined by upper and lower diaphragms, there being tool supporting means in each chamber, a slushing and cementing pipe extending downwardly through the tubular structure and through the confined liquid chambers, there being a readily drillable upper whipstock shield between the upper and lower liquid chambers and an inclined lower whipstock plate below the lower confined liquid chamber, the tubular structure having a lower readily drillable whipstock shield aligned with the whipstock plate, means to discharge the cement to cement the inside of the tubular structure except the confined liquid chambers and to cement the tool in a well hole whereby the cement inside the tubular structure may be drilled, the drilling removing the slushing tube and the diaphragms and forming a lower whipstock hole by diverting the drill by the lower whipstock plate.

8. In equipment for multiple whipstock drilling comprising in combination a tubular cementing tool having means for attachment to a drill tubing sub and including a tubular structure having an upper and lower confined liquid chamber, each chamber being defined by upper and lower diaphragms, there being tool supporting means in each chamber, a slushing and cementing pipe extending downwardly through the tubular structure and through the confined liquid chambers, there being a readily drillable upper whipstock shield between the upper and lower liquid chambers and an inclined lower whipstock plate below the lower confined liquid chamber, the tubular structure having a lower readily drillable whipstock shield aligned with the whipstock plate, means to discharge the cement to cement the inside of the tubular structure except the confined liquid chambers and to cement the tool in a well hole whereby the cement inside the tubular structure may be drilled, the drilling removing the slushing tube and the diaphragms and forming a lower whipstock hole by diverting the drill by the lower whipstock plate, an upper whipstock insertable in the tubular structure and supported in part in the lower former confined liquid chamber, such whipstock having an inclined whipstock plate, means to lock and align said upper whipstock plate with the upper whipstock shield whereby an upper whipstock hole may be drilled by a drill diverted by the upper whipstock plate and drilling through the upper whipstock shield.

9. In equipment for multiple whipstock drilling including in combination a cementing tool having an outer elongated tubular structure and including therein upper and lower confined liquid chambers, each defined by drillable upper and lower diaphragms, each chamber having means for supporting tools, a cementing tube extending downwardly through the outer tubular structure and having means for discharging cement to fill the interior of the outer tubular structure except for the confined liquid chambers and to cement the whole tool into a well hole, the cementing tube having the characteristic of being drillable whereby the said diaphragms and the cementing tube may be drilled out, an upper whipstock having an inclined whipstock plate supported in part at its lower end in the former lower confined liquid chamber, the outer tubular structure having a drillable upper whipstock shield aligned with the inclined upper whipstock plate whereby a drill may be diverted by such inclined upper whipstock plate, drill out the upper shield and drill an upper whipstock hole.

10. In equipment for multiple whipstock drilling, including in combination a cementing tool having an outer elongated tubular structure and including therein upper and lower confined liquid chambers, each defined by drillable upper and lower diaphragms, each chamber having means for supporting tools, a cementing tube extending downwardly through the outer tubular structure and having means for discharging cement to fill the interior of the outer tubular structure except for the confined liquid chambers and to cement the whole tool into a well hole, the cementing tube having the characteristic of being drillable whereby the said diaphragms and the cementing tube may be drilled out, an upper whipstock having an inclined whipstock plate supported in part at its lower end in the former lower confined liquid chamber, the outer tubular structure having a drillable upper whipstock shield aligned with the inclined upper whipstock plate whereby a drill may be diverted by such inclined upper whipstock plate, drill out the upper shield and drill an upper whipstock hole, the upper whipstock having a pivoted latch dog and the outer tubular structure ratchet steps to be engaged by the thrust end of the latch dog to latch the upper whipstock in position with the correct orientation, a removing tool for the upper whipstock including an operating rod, a head having removing pins, there being complementary slots in the upper portion of the upper whipstock to engage said pins, the removing tool having an end piece slidable and rotatable in relation to the said head, the end piece having means to be engaged and shift the latch dog to an unlatching position whereby the said operating rod may lift the upper whipstock.

11. In a multiple whipstock equipment including in combination a tubular structure insertable in the well and having a lower whipstock opening on one side with a lower whipstock liner therein, there being an upper whipstock opening with an upper whipstock liner supported above the opening, such upper whipstock liner having an elongated opening facing towards the interior of the tubular structure whereby tools may be lowered through the upper part of the upper whipstock hole liner to a lower portion of the lower whipstock liner.

12. In a multiple whipstock equipment, a tubular structure inserted in a well and having an upper whipstock hole opening, an upper whipstock hole liner supported in the tubular structure above the opening for the upper whipstock hole, such liner having an elongated opening on the inside facing towards the said tubular structure, a blank liner removably fitted in the upper liner and supported therein constructed and adapted to divert tools on being lowered into the upper whipstock hole liner.

13. In equipment for multiple whipstock drilling comprising in combination an outer elongated tubular structure having a lower elongated opening leading to a lower whipstock hole with a lower liner therein extending into such hole, interengaging means supporting the lower liner in the said tubular structure, an upper removable whipstock inserted through the tubular structure having its lower end supported on the lower liner, the upper whipstock having an inclined upper whipstock plate, a packer assembly including slips, a spring engageable in a guide groove in the elongated tubular structure for orienting the upper whipstock and seating the same whereby when the upper whipstock is seated a drilling tool may be diverted by the upper whipstock plate to drill an elongated upper opening in the tubular structures and an upper whipstock hole in the ground formation, the said packer assembly having the characteristics of collapsing the slips during the removal of the spring from the guide groove to thereby remove the upper whipstock.

14. In a whipstock equipment the combination of an outer elongated tubular structure leading downwardly in a well and having an elongated opening in one side communicating with a diverging whipstock hole, a tubular liner insertable through the said tubular structure and having a bottom beveled end, a guide end piece, a bolt having a spring thereon, the bolt interconnecting the said beveled end and a portion of the end piece whereby the end piece in lowering the liner is in alignment with the tubular structure and on reaching the opening to the whipstock hole diverts laterally and thereby guides the liner into the whipstock hole.

15. In equipment for whipstock drilling including in combination an elongated tubular cementing tool, a confined liquid chamber defined by upper and lower drillable diaphragms, said chamber having means therein to support tools, a cementing tube extending downwardly and through the diaphragms and the confined liquid chamber constructed and adapted for transmission and delivery of cement to cement the interior of the cementing tool except for the confined liquid chamber and to cement the tool in a well hole, the said cementing tube and the cement having the characteristics of being drillable whereby after removal of the diaphragms the tool supporting means in the former confined liquid chamber is left intact and unmarred.

16. In a well equipment, a water testing tool including in combination an elongated tubular tool structure constructed and adapted for insertion in a portion of a cementing tool, said water tester having elongated slots, a cementing tube extending through the water tester and constructed and adapted to discharge cement into a well hole whereby the cement enters the water testing tool through the elongated slots, the cementing tube and the cement being drillable whereby the water testing tool may be drilled out except for the cement lodged in and outside of the elongated slots, water in the formation being adapted to enter through the cement at the said slots.

17. In equipment for whipstock drilling comprising in combination an outer elongated tubular structure, an upper whipstock inserted therein and having an inclined whipstock plate, interengaging means between the whipstock and the tubular structure to support the whipstock at the desired position whereby the drill may be diverted by the whipstock plate to drill a whipstock hole, the said whipstock having hollow spaces, a whipstock removal tool having means for lowering the same in the well with interengaging devices to engage the tool with the whipstock, the said tool having means for circulating a flushing liquid whereby material accumulated in the spaces of the whipstock may be flushed out.

18. In multiple whipstock equipment including in combination an outer tubular structure formed of a relatively hard metal with upper and lower openings closed by a softer and drillable metal forming upper and lower whipstock shields, a lower whipstock permanently secured in the tubular structure in alignment with the lower whipstock shield, the complete tubular structure being connected for lowering in the well as a unit.

19. In a well equipment, the combination of an elongated tubular structure having a lower whipstock with an inclined whipstock plate permanently secured therein, there being a lower whipstock hole in the formation and a lower whipstock liner fitted therein, means to interengage and support such lower liner by the tubular structure, such tubular structure having an upper whipstock hole opening leading to an upper whipstock hole and an upper whipstock liner extending into the upper whipstock hole, interengaging means supporting such upper liner in the tubular structure, the upper whipstock hole liner having an elongated opening facing inwardly towards the tubular structure, a blank liner fitted in the upper whipstock hole liner with means to support the blank liner by the upper whipstock hole liner, such blank liner having a closed surface at the elongated opening of the upper liner to divert tools to the upper whipstock hole.

20. In a well, an elongated outer tubular structure cemented in a well hole and having an elongated whipstock hole opening on one side, there being a lower whipstock hole extending laterally and downwardly therefrom with a lower whipstock liner extending into such hole, interengaging means supporting the lower liner in the tubular structure, the tubular structure having an upper whipstock hole opening with an upper liner extending therethrough, there being an upper whipstock hole in the formation with the upper liner extending therein and means to support the upper liner in the said tubular structure, the said liners being free of a bond with the cement cementing the tubular structure in the well hole.

WALLACE A. WARBURTON.